United States Patent
Venkatraman et al.

(10) Patent No.: US 9,025,859 B2
(45) Date of Patent: May 5, 2015

(54) INERTIAL SENSOR AIDED INSTANT AUTOFOCUS

(75) Inventors: Subramaniam Venkatraman, Santa Clara, CA (US); Szepo Robert Hung, Carlsbad, CA (US); Ruben M. Velarde, Chula Vista, CA (US); Carlos Manuel Puig, Santa Clara, CA (US)

(73) Assignee: Qualcomm Incorporated, San Diego, CA (US)

( * ) Notice: Subject to any disclaimer, the term of this patent is extended or adjusted under 35 U.S.C. 154(b) by 248 days.

(21) Appl. No.: 13/561,288

(22) Filed: Jul. 30, 2012

(65) Prior Publication Data

US 2014/0029837 A1  Jan. 30, 2014

(51) Int. Cl.
*G06K 9/00*    (2006.01)
*G06T 7/00*    (2006.01)

(52) U.S. Cl.
CPC .............. *G06T 7/0075* (2013.01); *G06T 7/0071* (2013.01); *G06T 2207/10016* (2013.01); *G06T 2207/30244* (2013.01)

(58) Field of Classification Search
CPC ... G06F 3/0304; G06T 7/0051; G06T 7/0071; G06T 7/2033; G06T 7/204; G06T 7/0075; G06T 7/20; G06K 9/0064; G06K 9/209
USPC ................... 382/106, 154, 255, 289
See application file for complete search history.

(56) References Cited

U.S. PATENT DOCUMENTS

| 5,231,443 | A | 7/1993 | Subbarao |
| 5,248,976 | A | 9/1993 | Niho et al. |
| 5,793,900 | A | 8/1998 | Nourbakhsh et al. |
| 6,038,074 | A | 3/2000 | Kitaguchi et al. |
| 7,676,146 | B2 | 3/2010 | Border et al. |
| 2004/0101161 | A1 | 5/2004 | Roh et al. |
| 2008/0245148 | A1* | 10/2008 | Fukumoto ................. 73/504.12 |
| 2010/0208089 | A1 | 8/2010 | Chang |
| 2011/0063446 | A1* | 3/2011 | McMordie et al. ........... 348/159 |

FOREIGN PATENT DOCUMENTS

WO   WO-2008038097   4/2008

OTHER PUBLICATIONS

Derrouich S., et al., "A combination of monocular CCD camera and inertial-sensor for range estimation", IECON-2002. Proceedings of the 28th. Annual Conference of the IEEE Industrial Electronics Society. Sevilla, Spain, Nov. 5-8, 2002, IEEE, New York,NY, US, vol. 3, Nov. 5, 2002, pp. 2191-2196.
International Search Report and Written Opinion—PCT/US2013/052494—ISA/EPO—Oct. 25, 2013.
Okatani T., et al., "Robust estimation of camera translation between two images using a camera with a 3D orientation sensor", Pattern Recognition, 2002. Proceedings. 16th International Conference on Quebec City, Que., Canada Aug. 11-15, 2002, Los Alamitos, CA, USA, IEEE Comput. Soc, US, vol. 1, Aug. 11, 2002, pp. 275-278.
You.S., et al., "Hybrid inertial and vision tracking for augumented reality registration," In Proc. VR 1999, pp. 260-267, Houston, Texas, USA, Mar. 13-17, 1999.
Co-pending U.S. Appl. No. 13/208,838, filed Aug. 12, 2011.

* cited by examiner

*Primary Examiner* — John Strege
(74) *Attorney, Agent, or Firm* — Muncy, Geissler, Olds & Lowe, P.C.

(57) ABSTRACT

The disclosure is directed to creating an inertial sensor aided depth map of a scene. An embodiment of the disclosure captures at least a first image and a second image during movement of a device caused by a user while framing or recording the scene, compensates for rotation between the first image and the second image, calculates an amount of translation of the device between the first image and the second image, calculates a pixel shift of a plurality of key points of the first image and the second image, and estimates a depth to one or more of the plurality of key points of the first image and the second image.

42 Claims, 6 Drawing Sheets

INERTIAL SENSOR AIDED INSTANT AUTOFOCUS

FIELD OF DISCLOSURE

The disclosure relates to image processing, and more particularly to creating an inertial sensor aided depth map of a scene.

BACKGROUND

When taking a picture or recording a video, cameras need to determine the focal distance that renders the subject of the image in sharpest focus. Current autofocus solutions require a search of different focal depths and measuring contrast or performing phase detection using dedicated sensors. Another solution, known as dual-camera depth estimation, performs depth estimation using two cameras. Another conventional solution is focus stacking, which requires a camera to take a number of pictures at different focal depths and combine, or "stack," them into one picture.

Many camera users also have a desire to form three-dimensional views of a given scene. While this can be done using stereoscopic cameras, it is difficult to do so with a single camera. While a stereoscopic camera can be approximated using a single camera by instructing the user to move the camera and take two photos at two horizontally displaced locations, this requires user intervention.

SUMMARY

The disclosure is directed to creating an inertial sensor aided depth map of a scene. An embodiment of the disclosure captures at least a first image and a second image during movement of a device caused by a user while framing or recording the scene, compensates for rotation between the first image and the second image, calculates an amount of translation of the device between the first image and the second image, calculates a pixel shift of a plurality of key points of the first image and the second image, and estimates a depth to one or more of the plurality of key points of the first image and the second image.

BRIEF DESCRIPTION OF THE DRAWINGS

The accompanying drawings are presented to aid in the description of embodiments of the invention and are provided solely for illustration of the embodiments and not limitation thereof.

DETAILED DESCRIPTION

Figure 1:
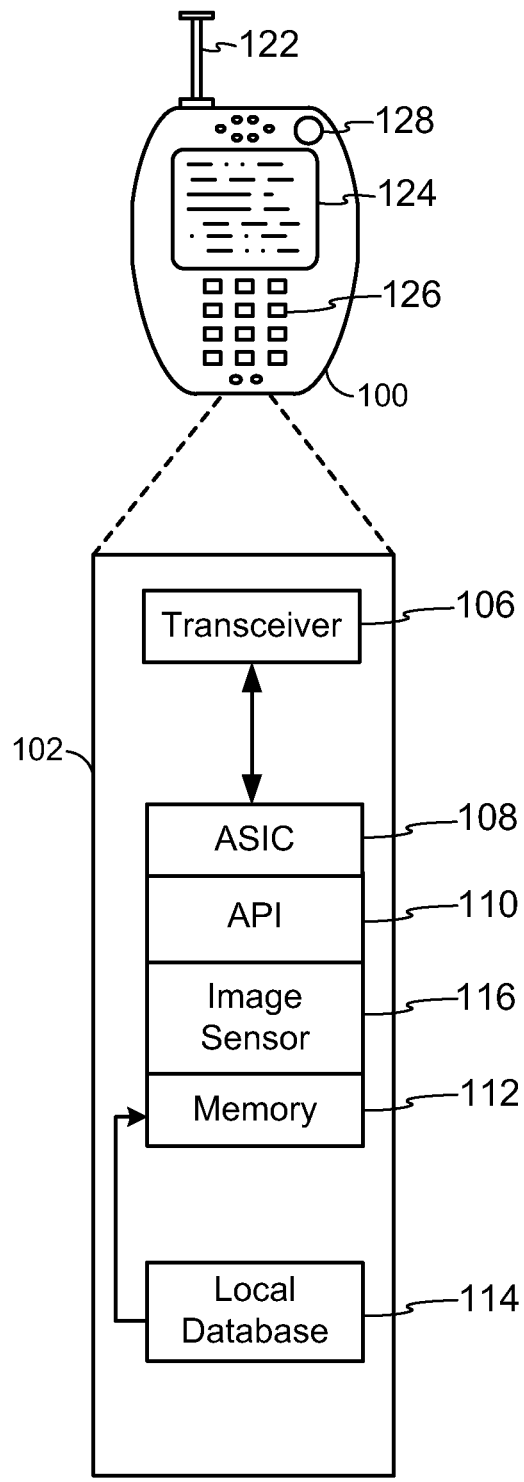
FIG. 1 illustrates an example of user equipment according to an exemplary embodiment.

Aspects of the invention are disclosed in the following description and related drawings directed to specific embodiments of the invention. Alternate embodiments may be devised without departing from the scope of the invention. Additionally, well-known elements of the various embodiments of invention will not be described in detail or will be omitted so as not to obscure the relevant details of the various embodiments invention.

The word "exemplary" is used herein to mean "serving as an example, instance, or illustration." Any embodiment described herein as "exemplary" is not necessarily to be construed as preferred or advantageous over other embodiments. Likewise, the term "embodiments of the invention" does not require that all embodiments of the invention include the discussed feature, advantage or mode of operation.

The terminology used herein is for the purpose of describing particular embodiments only and is not intended to be limiting of embodiments of the invention. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

When taking a picture or recording a video, a camera may attempt to automatically determine the focal distance that renders the subject of the image in sharpest detail. This is called autofocus. Current autofocus solutions require searching different focal depths and measuring contrast, or performing phase detection. Alternately, different sensing modalities, such as infrared and ultrasound, are used to estimate the distance of the subject from the camera. Another solution, known as dual-camera depth estimation, performs depth estimation using two cameras. Another conventional solution is focus stacking, which requires a camera to take a number of pictures at different focal depths and combine, or "stack," them into one picture.

Many camera users also have a desire to form three-dimensional (3D) views of a given scene. While this can be done using stereoscopic cameras, it is difficult to do so with a single camera. A stereoscopic camera is a camera, either still or video, which has two or more lenses, each with a separate image sensor. While a stereoscopic camera can be approximated using a single camera and instructing the user to move the camera and take two photos at two horizontally displaced locations, this requires user intervention. It would be preferable to form a 3D representation of a scene in the absence of such user involvement.

Often, a user moves the camera to a small extent while framing a photo or taking a video. Embodiments of the invention take advantage of these unintentional or random motions to form a 3D representation of a scene or perform autofocus. During this movement, the camera captures at least two images of the scene (a.k.a. frames) before the user snaps the picture or while the user records the scene. The movement may consist of both rotation and translation. By cancelling out the effects of rotation, multiple frames, separated only by camera translation, can be obtained, providing an approximation of a stereoscopic camera. This permits the camera to quickly autofocus on the area of interest in a given scene, and/or create a 3D depth map of the scene that can be used to form a 3D image of the scene.

Integrated inertial micro-electro-mechanical systems (MEMS) sensors, such as accelerometers and gyroscopes, have recently made their way into low-cost mobile devices such as consumer cameras and cellular phones with camera capability. Gyroscopes measure device rotation along all three axes by measuring the angular velocity of the device along those axes. Assuming that a user starts moving the camera after the first frame is captured, the total rotation between the first frame and the last frame can be computed by integrating the rotation matrix derived from the angular velocity measurements. The last frame can then be transformed using a projective transform derived from this rotation matrix to cancel out the effects of the rotation and closely match the first frame.

The user movement will likely also consist of some translation. The camera translation between the first and last frames can be computed from the image itself or by integrating the accelerometer data to arrive at the linear separation between the two images. Moving subjects in the frame can be identified by looking for local motion that does not match the motion predicted by the inertial sensors. Slowly moving subjects can be considered stationary if they do not move significantly for the duration of the camera motion. Once the effect of rotation has been cancelled out, the remaining difference in stationary parts of the scene between the first and last frames is due to translation. This translation causes the image of objects near the camera to move more than objects far away from the camera. This fact can be used to infer the relative or absolute distance of objects from the camera and form a depth map of the scene. The same technique can also be used to estimate the size of objects in the scene.

Once the depth map is formed, it can be used to create a 3D model of the scene and create a 3D photo or video. It can also be used to aid in continuous autofocus by providing the depth of the object of interest. This allows the autofocus algorithm to directly focus at the depth of the object of interest as opposed to searching different depths as is currently done.

This inertial sensor aided autofocus can be used in both camera and video applications. If the user pans the device before taking a photo, the depth of the scene can be estimated using the method described above, and the lens can be moved directly to the desired focus position at the end of the pan instead of searching for an optimal focus point at the end of the pan. In the case of a video, the lens position at the end of the pan would be gradually changed to ensure that no abrupt change is seen in the video.

FIG. 1 illustrates an example user equipment (UE) 100, such as a cellular telephone, in accordance with at least one embodiment of the invention. While FIG. 1 illustrates a cellular telephone with an integrated camera, it is apparent that the various embodiments can be incorporated into any camera, whether integrated into another device or standing alone. In this disclosure, the terms UE, camera, and device are used interchangeably.

UE 100 has a platform 102 that can receive and execute software applications, data and/or commands transmitted from a radio access network (RAN) that may ultimately come from a core network, the Internet, and/or other remote servers and networks. The platform 102 can include a transceiver 106 operably coupled to an application specific integrated circuit (ASIC) 108, or other processor, microprocessor, logic circuit, or other data processing device. The ASIC 108 or other processor executes the application programming interface (API) 110 layer that interfaces with any resident programs in the memory 112 of UE 100. The memory 112 can be comprised of read-only memory (ROM) or random-access memory (RAM), electrically erasable programmable ROM (EEPROM), flash cards, or any memory common to computer platforms. The platform 102 also can include a local database 114 that can hold applications not actively used in memory 112. The local database 114 is typically a flash memory cell, but can be any secondary storage device as known in the art, such as magnetic media, EEPROM, optical media, tape, soft or hard disk, or the like. The internal platform 102 components can also be operably coupled to external devices such as antenna 122, display 124, and keypad 126 among other components, as is known in the art.

UE 100 also includes an image sensor 116, which may be one or more charge-coupled devices (CCDs), a complementary metal-oxide-semiconductor (CMOS), or any other image sensor. Image sensor 116 is operatively coupled to camera lens 128. Lens 128 is illustrated as facing the user, but it is apparent that it could be positioned on any face of UE 100.

Accordingly, an embodiment of the invention can include a UE including the ability to perform the functions described herein. As will be appreciated by those skilled in the art, the various logic elements can be embodied in discrete elements, software modules executed on a processor or any combination of software and hardware to achieve the functionality disclosed herein. For example, ASIC 108, memory 112, API 110, and local database 114 may all be used cooperatively to load, store and execute the various functions disclosed herein and thus the logic to perform these functions may be distributed over various elements. Alternatively, the functionality could be incorporated into one discrete component. Therefore, the features of the UE 100 in FIG. 1 are to be considered merely illustrative and the invention is not limited to the illustrated features or arrangement.

Figure 2:
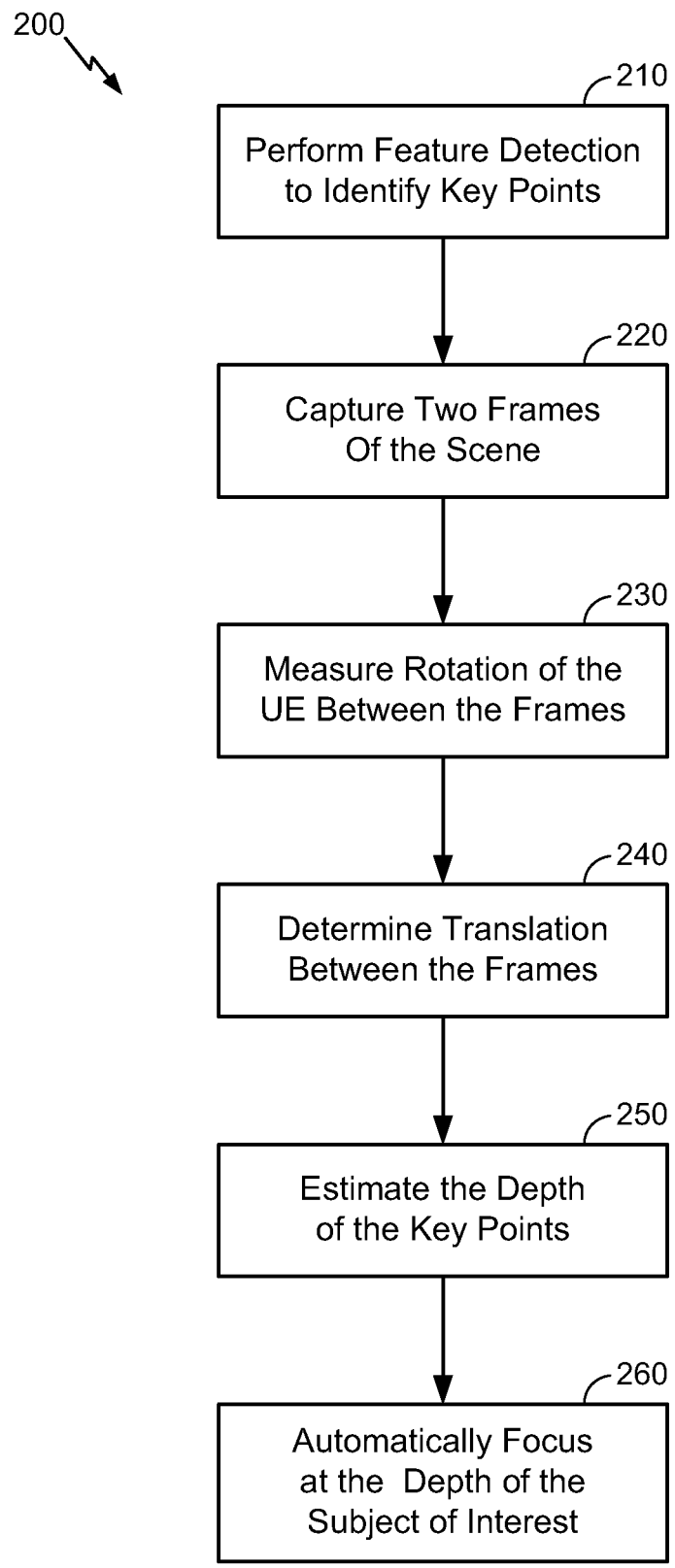
FIG. 2 is a flowchart illustrating an exemplary embodiment.
Figure 3:
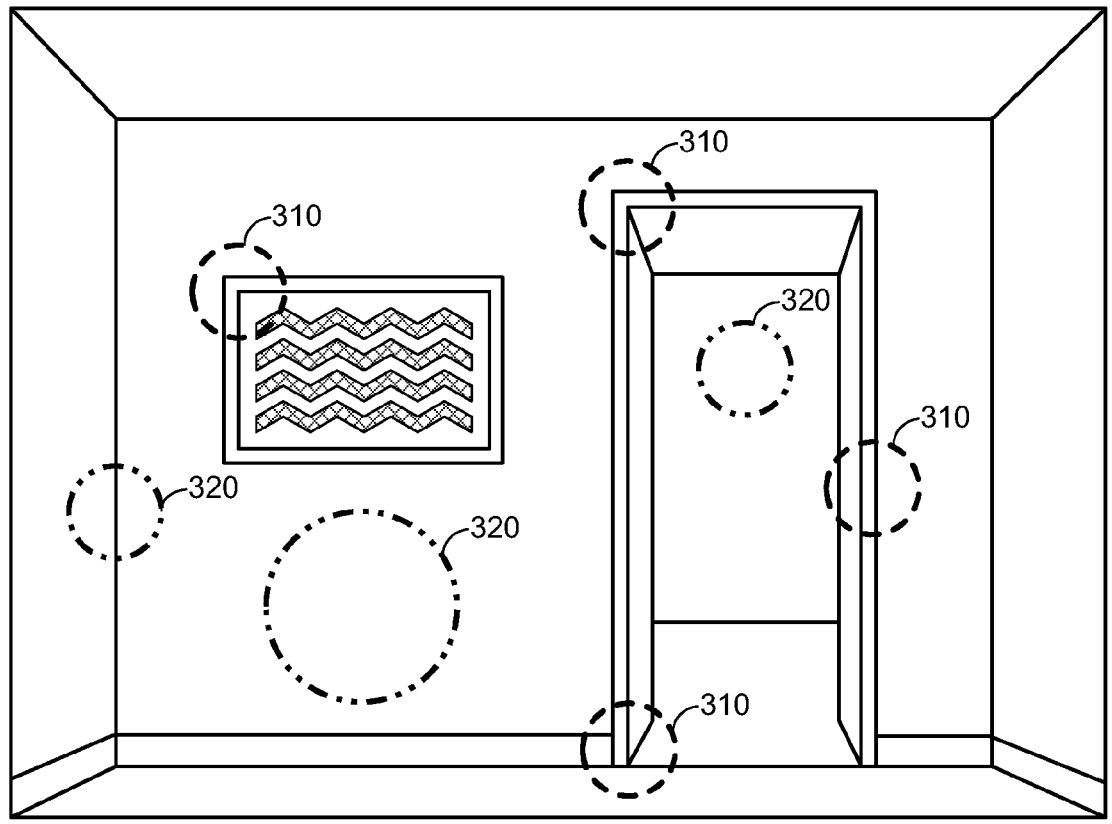
FIG. 3 illustrates examples of key points according to an exemplary embodiment.

FIG. 2 is a flowchart 200 illustrating an exemplary embodiment of the invention. At 210, UE 100 performs feature detection to identify multiple features of interest, i.e. key points, in a frame. A key point tracker integrated into UE 100 identifies and tracks key points across multiple frames. Key points should be easily identifiable and trackable points in a frame. Examples of good key points would be corners of high-textured objects. FIG. 3 illustrates examples of good key points 310 and bad key points 320 in an exemplary frame. As can be seen, good key points 310 are at points of high contrast, such as corners or sharp edges, while bad key points 320 are at points of low contrast, such as walls or similarly-colored edges.

At 220-240, UE 100 uses the natural movements of the user while framing the photo or recording the video to estimate the distance to various objects in the scene. At 220, UE 100 captures at least two frames of the scene while the user is framing the photo or recording the video. The time difference between the first and second frames is chosen based on the speed at which the user is moving the camera. For example, for slow movements, a longer time is chosen to lead to a sufficiently large translation. A particular value of camera translation is required to resolve object depths at a given distance, as discussed below with reference to FIG. 2, 240, and FIG. 6.

While FIG. 2 illustrates 210 and 220 as occurring consecutively, it is apparent that they may occur simultaneously or in reverse order. That is, while UE 100 is capturing multiple frames, the key points tracker may be identifying and tracking key points within those frames. Alternatively, after UE 100 captures the at least two frames, the key points tracker may then identify and track the key points within those frames.

Figure 4:
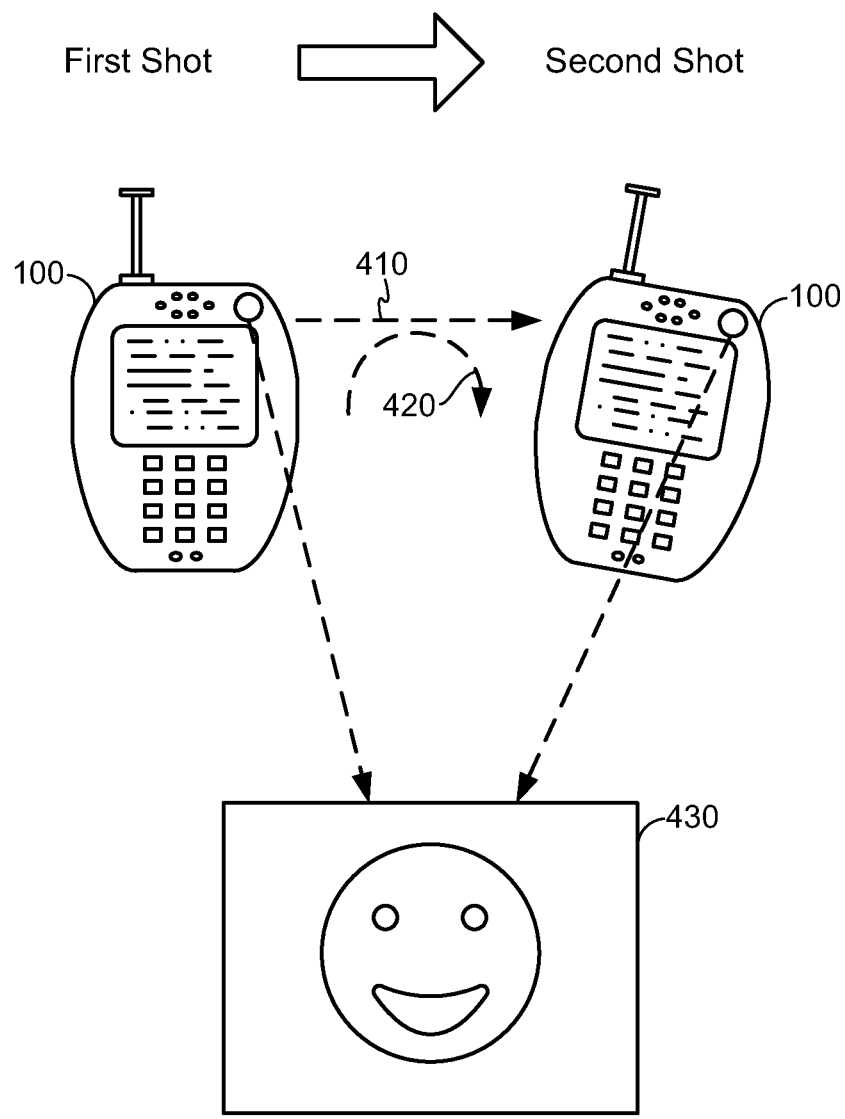
FIG. 4 illustrates an example of rotation and translation according to an exemplary embodiment.

At 230, UE 100 uses its internal gyroscope to measure the rotation of the camera in three dimensions during the time interval between the two frames. If UE 100 is not equipped with a gyroscope, it can estimate the rotation between two frames using the key points extracted from the first and second frame alone. To do this, UE 100 estimates the best scaling factor and roll/yaw/pitch angle that minimizes the difference between the images. That is, given a set of key points (x1, y1), (x2, y2), . . . (xn, yn) for the first frame and a set of key points (x1', y1'), (x2', y2'), . . . (xn', yn') for the second frame, UE 100 performs scaling and 3D projection to the key points on the second frame so that the sum of the absolute difference of (yi, yi') for i=1 to n can be minimized. Compensating for the rotation of UE 100 between the first and second frames leaves only pure translation between the two frames. FIG. 4 illustrates an example of how UE 100 may be rotated 420 and translated 410 between two frames while taking a picture of scene 430.

Figure 5:
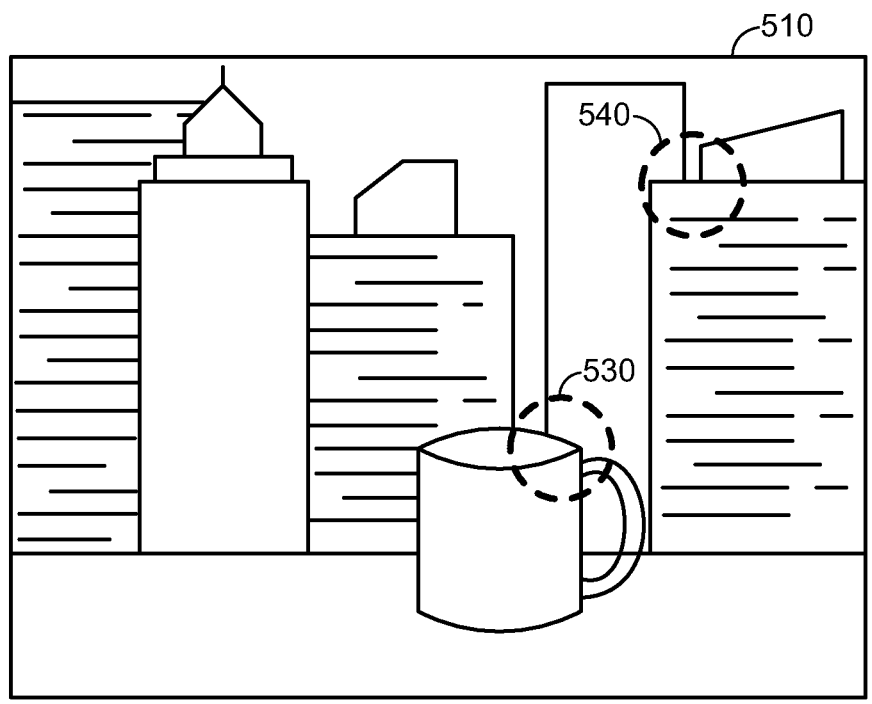
FIG. 5 illustrates exemplary movement between objects at different depths according to an exemplary embodiment.
Figure 5:
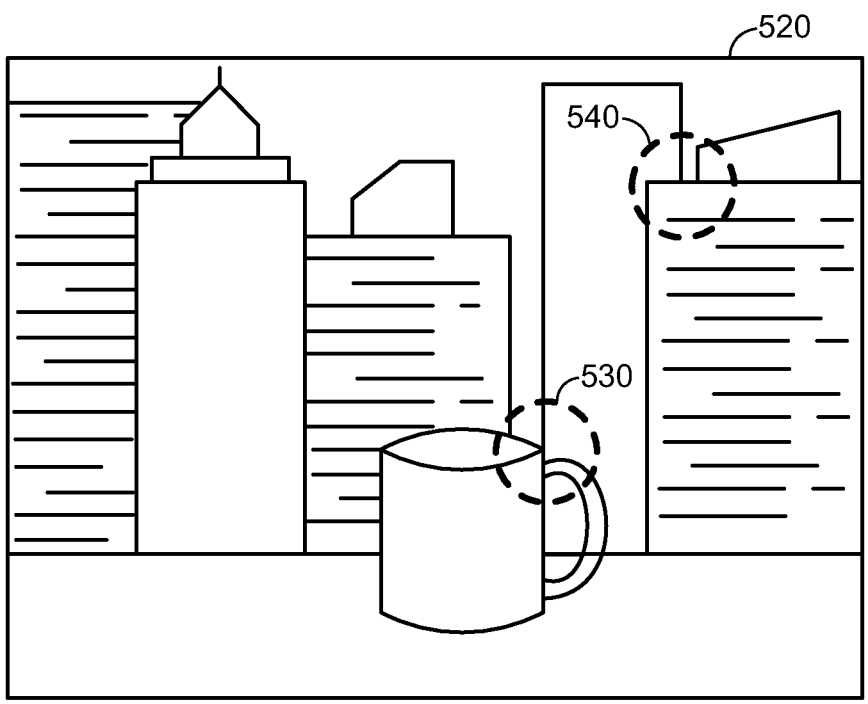

Objects at different distances from the camera move to different extents due to camera translation. This disparity in the movement of different key points is used to estimate object depth. FIG. 5 illustrates an example of the movement between objects at different depths from frame 510 to frame 520. Specifically, key point 530, in the foreground, shifts noticeably, while key point 540, in the background, moves a smaller distance.

Referring to FIG. 2, at 240, UE 100 determines the amount of translation between the first and second frames. A sufficiently large value of camera translation is required to resolve object depths at a given distance. Translation can be obtained by integrating the accelerometer data twice to get position. This is inherently a very noisy process and requires excellent accelerometer and gyroscope calibration. Embodiments of the invention may continuously calibrate the accelerometer and gyroscope by comparing consecutive frames to detect when UE 100 is stationary and using those instants to calibrate both sensors.

Figure 6:
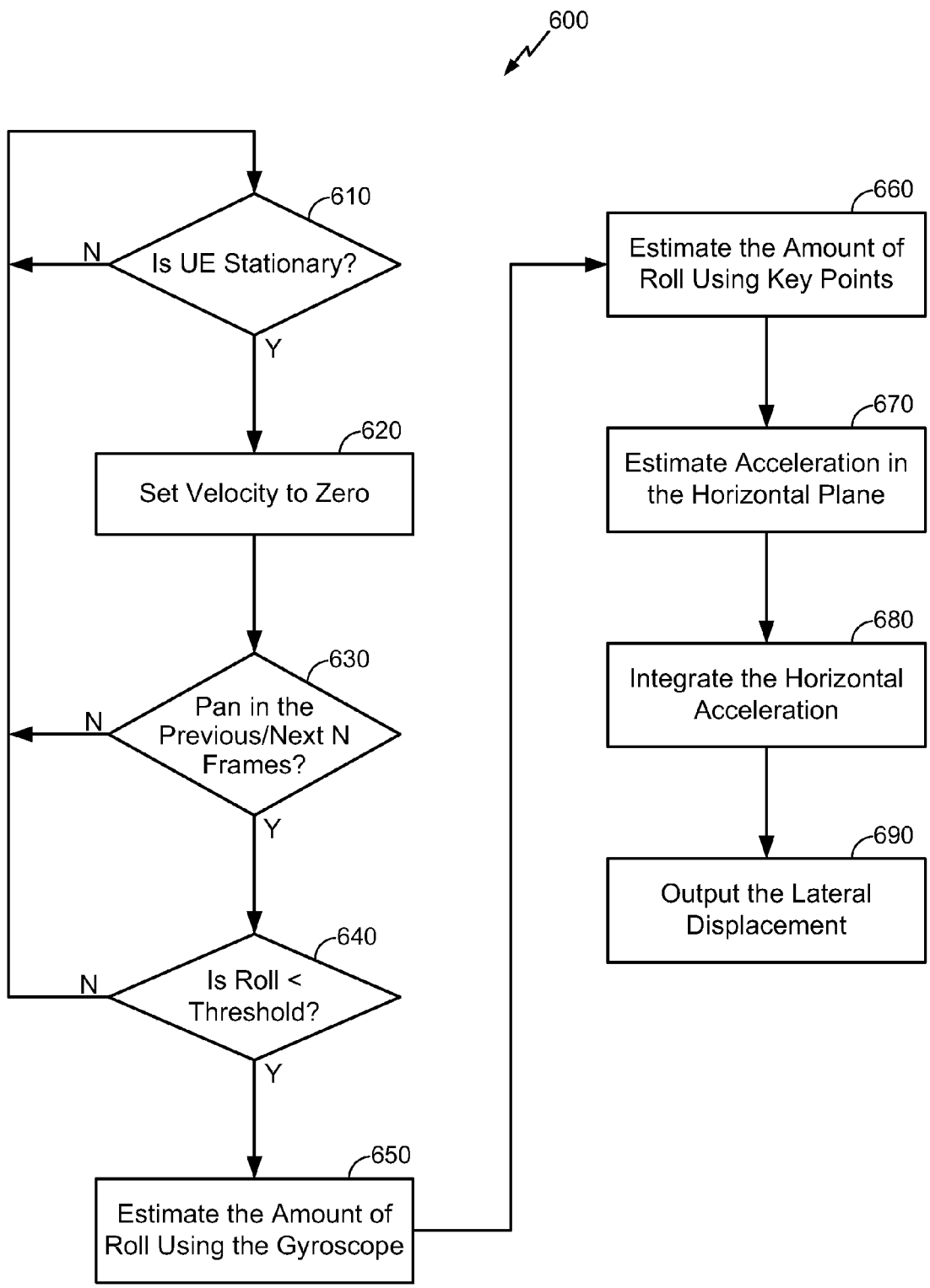
FIG. 6 is a flowchart illustrating an exemplary embodiment to determine the translation of a user equipment.

FIG. 6 is a flowchart 600 illustrating an exemplary embodiment of the invention to determine the lateral displacement, and thereby translation, of UE 100. At 610, UE 100 determines whether it is stationary by determining if two consecutive images are identical to each other to within a threshold. If UE 100 is not stationary, then the flow waits until it is. If UE 100 is stationary, then at 620, UE 100 sets a value for its velocity to 0. At 630, UE 100 determines whether there was a pan in the previous N frames by determining whether the integrated pitch or yaw is greater than a threshold. This threshold is determined by taking into account the noise expected from the gyroscope. Alternatively, UE 100 determines if a pan is present in the N frames following the stationary period. If no pan is found, then the flow returns to 610 to wait until there is a pan. If a pan is found, then at 640, UE 100 determines whether its roll during the pan is less than a threshold, because the process cannot handle pans with a significant amount of roll. If it is not, then the flow returns to 610 to wait until it is. If the roll is less than the threshold, then at 650, UE 100 estimates the amount of roll using the gyroscope by integrating the measured angular velocity to obtain the total rotation between the first and last frames of the pan. The roll estimate is provided to the key point tracker, and at 660, UE 100 calculates a more accurate roll estimate using the key points. At 670, UE 100 estimates the amount of acceleration in the horizontal plane. At 680, UE 100 integrates that estimate to obtain the horizontal velocity, then integrates it again to obtain the lateral displacement of the camera between the first and last frame. This produces, at 690, the lateral displacement of UE 100.

Referring to FIG. 2, at 250, UE 100 estimates the depth of the key points identified at 210. Often, the subject of a photograph or video is a person, so it is desirable to detect a face and precisely estimate its depth. Embodiments of the invention use face detection algorithms to detect one or more faces and track the features that belong to this face to estimate its depth. Other techniques can be used to infer the principal subject of the frame if no faces are present. For example, a user interface can be used whereby the user chooses the subject of interest using a touch screen.

Assuming a camera focal length of 3.546 mm and a pixel pitch of 0.0014 mm, and assuming that UE 100 can detect a one pixel motion of a key point, one pixel shift on the sensor plane translates to an angular shift of del_theta=(pixel_pitch/focal length)=$3.94*10^{-4}$ radian. For an object at depth d, the camera shift that causes a shift of one pixel is d*del_theta. This suggests that the depth of objects meters away from the camera can be resolved using mm scale camera translation.

Objects that move during depth estimation need to be identified since they might lead to spurious depth estimates. This can be accommodated by calculating the movement of the different features, or key points, in the scene compared to a global motion vector. Features that belong to moving objects are not included in the depth estimation algorithm.

At 260, once the depth of the subject is estimated, UE 100 automatically focuses on the accurate depth or performs a search in a narrow window around the optimum depth. This provides a significant speedup in autofocus when the user takes a photograph or video. Alternatively, once this depth map is formed, it can be used to create a 3D model of the scene and create a 3D photo or video.

Further, the orientation of UE 100 with respect to the vertical can be obtained using the accelerometer. This orientation helps to estimate the lens movement driving current since pointing up takes a larger current to move the lens to the desired position due to gravity. Less current is needed when pointing down.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the various embodiments of the invention.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, an embodiment of the invention can include a computer readable media embodying a method for creating an inertial sensor aided depth map of a given scene. Accordingly, the invention is not limited to illustrated examples and any means for performing the functionality described herein are included in embodiments of the invention.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method for creating an inertial sensor aided depth map of a scene, comprising:
    capturing at least a first image and a second image during movement of a device caused by a user while framing or recording the scene;
    compensating for rotation between the first image and the second image;
    calculating an amount of translation of the device between the first image and the second image;
    calculating a pixel shift of a plurality of key points of the first image and the second image; and
    estimating a depth to one or more of the plurality of key points of the first image and the second image.

2. The method of claim 1, further comprising:
    identifying the plurality of key points of the first image and the second image.

3. The method of claim 1, wherein the calculating the amount of translation is based on inertial sensors of the device.

4. The method of claim 1, wherein the estimating comprises estimating an absolute depth from the device to the one or more of the plurality of key points or a relative depth of the one or more of the plurality of key points with respect to each other.

5. The method of claim 1, further comprising:
    estimating an amount of rotation of the device between the first image and the second image.

6. The method of claim 5, wherein the estimating the amount of rotation is based at least in part on data from a gyroscope.

7. The method of claim 6, further comprising:
    periodically calibrating the gyroscope based on periods of time during which movement of the device is below a threshold.

8. The method of claim 5, wherein the estimating the amount of rotation is based at least in part on a comparison of tracking features of each of the first image and the second image.

9. The method of claim 1, wherein the calculating the amount of translation is based at least in part on data from an accelerometer.

10. The method of claim 9, further comprising:
    periodically calibrating the accelerometer based on periods of time during which the movement of the device is below a threshold.

11. The method of claim 10, wherein the periodically calibrating comprises determining when the movement of the device is below the threshold by comparing consecutive images recorded by the device.

12. The method of claim 1, wherein the calculating the amount of translation comprises integrating a gravity-compensated acceleration to obtain the amount of translation of the device between the first image and the second image.

13. The method of claim 1, wherein the capturing is performed within a given time and a given range of motion.

14. The method of claim 1, wherein the plurality of key points are a plurality of key points of each of the first image and the second image.

15. The method of claim 1, further comprising:
    determining a focus setting based on the estimating.

16. The method of claim 15, wherein the focus setting is a focal length or a lens position that is adjusted based on the estimated depth.

17. The method of claim 15, wherein the determining is based on a facial recognition algorithm.

18. The method of claim 15, wherein the determining is based on a user selected region of the first image or the second image.

19. The method of claim 1, further comprising:
    obtaining an orientation of the device with respect to a vertical axis using an accelerometer; and
    estimating a driving current for a lens of the device based on the obtaining.

20. The method of claim 1, where the device is one of a wireless device with an integrated camera, a smartphone, a camera, or a video camcorder.

21. An apparatus for creating an inertial sensor aided depth map of a scene, comprising:
    logic configured to capture at least a first image and a second image during movement of a device caused by a user while framing or recording the scene;
    logic configured to compensate for rotation between the first image and the second image;
    logic configured to calculate an amount of translation of the device between the first image and the second image;
    logic configured to calculate a pixel shift of a plurality of key points of the first image and the second image; and
    logic configured to estimate a depth to one or more of the plurality of key points of the first image and the second image.

22. The apparatus of claim 21, further comprising:
    logic configured to identify the plurality of key points of the first image and the second image.

23. The apparatus of claim 21, wherein the calculating the amount of translation is based on inertial sensors of the device.

24. The apparatus of claim 21, wherein the estimating comprises estimating an absolute depth from the device to the one or more of the plurality of key points or a relative depth of the one or more of the plurality of key points with respect to each other.

25. The apparatus of claim 21, further comprising:
logic configured to estimate an amount of rotation of the device between the first image and the second image.

26. The apparatus of claim 25, wherein the logic configured to estimate the amount of rotation is based at least in part on data from a gyroscope.

27. The apparatus of claim 26, further comprising:
logic configured to periodically calibrate the gyroscope based on periods of time during which movement of the device is below a threshold.

28. The apparatus of claim 25, wherein the logic configured to estimate the amount of rotation is based at least in part on a comparison of tracking features of each of the first image and the second image.

29. The apparatus of claim 23, wherein the logic configured to calculate the amount of translation is based at least in part on data from an accelerometer.

30. The apparatus of claim 29, further comprising:
logic configured to periodically calibrate the accelerometer based on periods of time during which the movement of the device is below a threshold.

31. The apparatus of claim 30, wherein the logic configured to periodically calibrate comprises determining when the movement of the device is below the threshold by comparing consecutive images recorded by the device.

32. The apparatus of claim 23, wherein the logic configured to calculate the amount of translation comprises logic configured to integrate a gravity-compensated acceleration to obtain the amount of translation of the device between the first image and the second image.

33. The apparatus of claim 23, wherein the logic configured to capture is performed within a given time and a given range of motion.

34. The apparatus of claim 23, wherein the plurality of key points are a plurality of key points of each of the first image and the second image.

35. The apparatus of claim 23, further comprising:
logic configured to determine a focus setting based on the estimating.

36. The apparatus of claim 35, wherein the focus setting is a focal length or a lens position that is adjusted based on the estimated depth.

37. The apparatus of claim 35, wherein the determining is based on a facial recognition algorithm.

38. The apparatus of claim 35, wherein the determining is based on a user selected region of the first image or the second image.

39. The apparatus of claim 21, further comprising:
logic configured to obtain an orientation of the device with respect to a vertical axis using an accelerometer; and
logic configured to estimate a driving current for a lens of the device based on the obtaining.

40. The apparatus of claim 21, where the device is one of a wireless device with an integrated camera, a smartphone, a camera, or a video camcorder.

41. An apparatus for creating an inertial sensor aided depth map of a scene, comprising:
means for capturing at least a first image and a second image during movement of a device caused by a user while framing or recording the scene;
means for compensating for rotation between the first image and the second image;
means for calculating an amount of translation of the device between the first image and the second image;
means for calculating a pixel shift of a plurality of key points of the first image and the second image; and
means for estimating a depth to one or more of the plurality of key points of the first image and the second image.

42. A non-transitory computer-readable medium for creating an inertial sensor aided depth map of a scene, comprising:
at least one instruction to capture at least a first image and a second image during movement of a device caused by a user while framing or recording the scene;
at least one instruction to compensate for rotation between the first image and the second image;
at least one instruction to calculate an amount of translation of the device between the first image and the second image;
at least one instruction to calculate a pixel shift of a plurality of key points of the first image and the second image; and
at least one instruction to estimate a depth to one or more of the plurality of key points of the first image and the second image.

* * * * *